(12) United States Patent
Rothkopf et al.

(10) Patent No.: US 8,148,622 B2
(45) Date of Patent: Apr. 3, 2012

(54) MEDIA PLAYBACK QUEUING FOR PLAYBACK MANAGEMENT

(75) Inventors: Fletcher R. Rothkopf, Mountain View, CA (US); John Benjamin Filson, San Jose, CA (US); Kyle H. Yeates, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 12/496,402

(22) Filed: Jul. 1, 2009

(65) Prior Publication Data

US 2011/0004330 A1    Jan. 6, 2011

(51) Int. Cl.
*G10H 1/00* (2006.01)
*G10H 1/18* (2006.01)
*G10H 7/00* (2006.01)

(52) U.S. Cl. ............................................ 84/615; 84/604

(58) Field of Classification Search .................... 84/615, 84/604
See application file for complete search history.

(56) References Cited

U.S. PATENT DOCUMENTS

| | | | |
|---|---|---|---|
| 6,430,537 B1* | 8/2002 | Tedesco et al. ............... | 705/7.22 |
| 7,205,471 B2 | 4/2007 | Looney et al. | |
| 7,680,849 B2 | 3/2010 | Heller et al. | |
| 7,797,446 B2 | 9/2010 | Heller et al. | |
| 7,827,259 B2 | 11/2010 | Heller et al. | |
| 7,860,830 B2 | 12/2010 | Mirrashidi et al. | |
| 7,958,441 B2 | 6/2011 | Heller et al. | |
| 2003/0018966 A1* | 1/2003 | Cook et al. ........................ | 725/2 |
| 2005/0240494 A1 | 10/2005 | Cue et al. | |
| 2005/0262259 A1 | 11/2005 | O'Rourke et al. | |
| 2006/0015378 A1 | 1/2006 | Mirrashidi et al. | |
| 2006/0156239 A1 | 7/2006 | Jobs et al. | |
| 2006/0247980 A1 | 11/2006 | Mirrashidi et al. | |
| 2007/0271312 A1 | 11/2007 | Heller et al. | |
| 2008/0080837 A1 | 4/2008 | Mei et al. | |
| 2008/0104121 A1* | 5/2008 | Gottlieb et al. ............ | 707/104.1 |
| 2008/0148152 A1 | 6/2008 | Blinnikka | |
| 2008/0189318 A1 | 8/2008 | Bourke et al. | |
| 2008/0281867 A1 | 11/2008 | Kendall et al. | |
| 2009/0063543 A1 | 3/2009 | Martin et al. | |
| 2009/0183060 A1* | 7/2009 | Heller et al. .................. | 715/202 |
| 2009/0240721 A1* | 9/2009 | Giacalone, Jr. ............... | 707/101 |
| 2010/0042654 A1 | 2/2010 | Heller et al. | |

OTHER PUBLICATIONS

U.S. Appl. No. 10/936,233, entitled "Method and System for Dynamically Populating Groups in a Developer Environment", filed Sep. 7, 2004.
Dennis Lloyd, "Wishing for a Play Queue for iPod", iLounge, Apr. 24, 2003, 15 pages.
"About Play Lists", Main Help Page, iTunes, downloaded Jun. 15, 2009, 2 pages.
"Creating a Custom Mix Using Party Shuffle", Main Help Page, iTunes, downloaded Jun. 15, 2009, 1 page.

* cited by examiner

*Primary Examiner* — Jeffrey Donels

(57) ABSTRACT

Management or coordination of playback of digital media assets by an electronic device (e.g., a computing device), that supports media playback is disclosed. According to one embodiment, the electronic device can be controlled such that a user is able to schedule playback of distinct digital media assets.

19 Claims, 9 Drawing Sheets

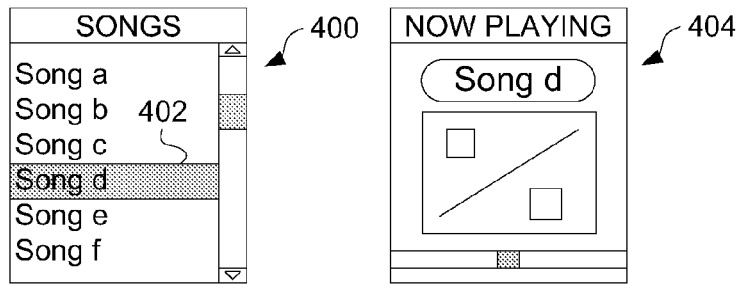
FIG. 4A  FIG. 4B
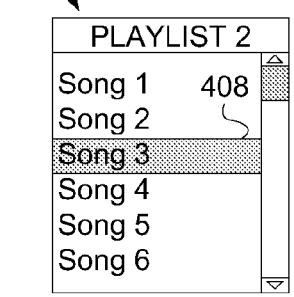
FIG. 4C
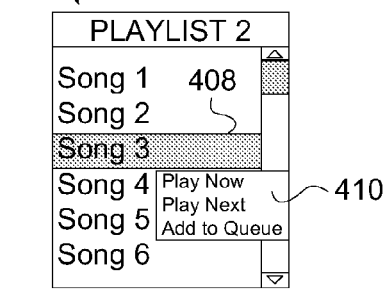
FIG. 4D
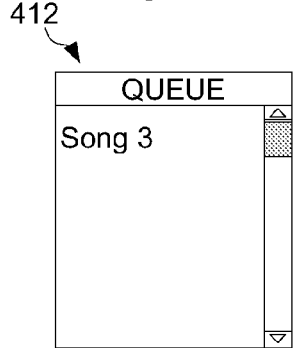 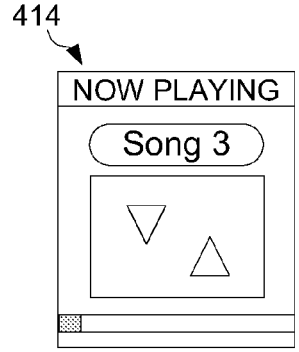
FIG. 4E  FIG. 4F

MEDIA PLAYBACK QUEUING FOR PLAYBACK MANAGEMENT

BACKGROUND OF THE INVENTION

1. Field of the Invention

The present invention relates to playback of media items and, more particularly, to management of playback of media items on a client computing device.

2. Description of the Related Art

Conventionally, jukeboxes have been installed at restaurants or entertainment venues to provide music to patrons. Patrons typically insert money into a slot on a jukebox and then are entitled to select one or a few songs to be played by the jukebox. The songs are play back by the jukebox in the order they are selected.

Today, music management and playback programs, such as iTunes™ from Apple Inc. of Cupertino, Calif., allow users to make playlists of songs. Thereafter, users can select a playlist for playback and have the music management and playback program play back the songs from the selected playlist. However, once a playlist is playing, if a user selects a particular song to be played, the currently played song of the playlist is stopped and the new song is played. After the song has played, the playback stops until the user selects another song or playlist for playback.

While the music management and playback programs operate on personal computers (such as desktop computers, portable computers, or netbooks), portable media players, such as MP3 players (e.g., iPod™ from Apple Inc. of Cupertino, Calif.), can operate to playback songs in a similar manner. Portable media players storage many songs or movies that users can select for playback by the portable media players. However, portable media players operate through graphical user interfaces to permit users to select a song or movie for playback. Once the song or movie is selected, playback of the selected song or movie is initiated. However, while the selected song or movie is being played, users are not able to select subsequent songs or movies to be played. Specifically, if users select another song or movie to be played, the currently played song or movies is stopped and then playback of the newly selected song or movies is initiated.

Therefore, there is a need for improved approaches to manage or coordinate playback of digital media assets.

SUMMARY

The invention relates to management or coordination of playback of digital media assets by an electronic device, such as a computing device, that supports media playback. According to one embodiment, a computing device can be controlled such that a user is able to schedule playback of distinct digital media assets.

In one embodiment, a computing device can provide a playback queue that can facilitate scheduling playback of distinct digital media assets. Digital media assets to be played subsequently can be listed in the playback queue to thereby manage playback of various digital media assets. In one embodiment, a graphical user interface can assist a user in scheduling playback of the distinct digital media assets.

In another embodiment, multiple users can contribute digital media assets for playback to a media playback queue being utilized by a designated playback device. Different rules or policies can govern contributions of digital media assets to the media playback queue. In one embodiment, multiple users can rate, vote or request addition, removal, placement or position of digital media assets within a media playback queue. The multiple users can be users of a single computing device or multiple computing devices.

The computing devices can, for example, be client computing devices that provide playback of digital media assets. Examples of client computing devices include: personal computers, mobile telephones, portable media players, personal digital assistants (PDAs). Often client computing devices, such as multi-function electronic devices, will support other functionality besides media playback.

The invention can be implemented in numerous ways, including as a method, system, device, apparatus (including computer readable medium and graphical user interface). Several embodiments of the invention are discussed below.

As method for controlling playback of digital media assets on a client computing device, one embodiment of the invention can, for example, include at least: selecting a playlist of digital media assets to be played back by the client computing device; and initiating playback of the digital media assets in the selected playlist. Additionally, during playback of the digital media assets in the selected playlist, the embodiment of the invention can, for example, further include at least: receiving a selection of a particular digital media asset to be played back; and interposing playback of the particular digital media asset as a next digital media asset to be played after playback of a digital media asset of the selected playlist being currently played has completed.

As a method for controlling playback of digital media assets on a client computing device, one embodiment of the invention can, for example, include at least: providing a queue for identifying one or more digital media assets that are to be played back at the client computing device; selecting a current digital media asset from the queue for playback; initiating playback of the current digital media asset by the client computing device; receiving, during playback of the current digital media asset, a selection of a particular digital media asset to be played back; and placing, during playback of the current digital media asset, the particular digital media asset that has been selected in the queue without interrupting the playback of the current digital media asset.

As a method for controlling playback of digital media assets on a client computing device, one embodiment of the invention can, for example, include at least: selecting one or a group of digital media assets to be played back by the client computing device; and initiating playback of the digital media assets in the selected playlist. Additionally, during playback of the digital media assets in the selected playlist, the embodiment of the invention can, for example, include at least: receiving a selection of at least a particular digital media asset to be played back; and placing the at least one particular digital media asset into a queue for eventual play back in accordance with ordering provided by the queue. Still further, the embodiment of the invention can, for example, include at least: selecting a next digital media asset from the queue as the next particular digital media asset to be played; and initiating playback of the next digital media asset from the selected playlist after playback of the current digital media asset has completed.

As a method for controlling playback of digital media assets on a client computing device, one embodiment of the invention can, for example, include at least: operating a digital media playback device in a first playback mode or a second playback mode; providing a playback queue configured to contain digital media assets to be played back; playing back at least one of the digital media assets in the playback queue; and receiving at least one first user selection of a particular digital media asset or a particular digital media asset group. Additionally, if in the first mode, the embodiment of the invention can further include at least: interrupting the digital media asset currently being played in response to the at least one first user selection, and playing the particular digital media asset or the particular digital media asset group instead of the digital media asset currently being played. Still further, if in the second mode, the embodiment of the invention can further include at least: placing the particular digital media asset or the particular digital media asset group into the playback queue such it is played after the digital media asset currently being played has completed.

As a computer readable medium including at least computer program code tangibly stored thereon for controlling playback of digital media assets on a client computing device, one embodiment of the invention can, for example, include at least: computer program code for providing a queue for identifying one or more digital media assets that are to be played back at the client computing device; computer program code for selecting a current digital media asset from the queue for playback; computer program code for initiating playback of the current digital media asset by the client computing device; computer program code for receiving, during playback of the current digital media asset, a selection of a particular digital media asset to be played back; and computer program code for placing, during playback of the current digital media asset, the particular digital media asset that has been selected in the queue without interrupting the playback of the current digital media asset.

As an electronic device, one embodiment of the invention can, for example, include at least: a media asset storage device configured to store a plurality of digital media assets; a user input device configured to receive one or more user inputs to specify user selection of one or more of the digital media assets; a display screen for presenting at least one graphical user interface that facilitates the user selection of one or more of the digital media assets; a playback queue configured to store an indication of any of the one or more of the digital media assets selected by the user selection that are to be subsequently played; a playback module configured to manage playback of the one or more of the digital media assets selected by the user selection using the user input device; and a processor for performing playback of the one or more of the digital media assets as managed by the playback module.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIGS. 4A-4F are representative screens that can be presented according to one embodiment.

DETAILED DESCRIPTION OF CERTAIN EMBODIMENTS

The invention relates to management or coordination of playback of digital media assets by an electronic device, such as a computing device, that supports media playback. According to one embodiment, a computing device can be controlled such that a user is able to schedule playback of distinct digital media assets.

In one embodiment, a computing device can provide a playback queue that can facilitate scheduling playback of distinct digital media assets. Digital media assets to be played subsequently can be listed in the playback queue to thereby manage playback of various digital media assets. In one embodiment, a graphical user interface can assist a user in scheduling playback of the distinct digital media assets.

In another embodiment, multiple users can contribute digital media assets for playback to a media playback queue being utilized by a designated playback device. Different rules or policies can govern contributions of digital media assets to the media playback queue. In one embodiment, multiple users can rate, vote or request addition, removal, placement or position of digital media assets within a media playback queue. The multiple users can be users of a single computing device or multiple computing devices.

The computing devices can, for example, be client computing devices that provide playback of digital media assets. Examples of client computing devices include: personal computers, mobile telephones, portable media players, personal digital assistants (PDAs). Often client computing devices, such as multi-function electronic devices, will support other functionality besides media playback.

Embodiments of various aspects of the invention are discussed below with reference to FIGS. 1-9. However, those skilled in the art will readily appreciate that the detailed description given herein with respect to these figures is for explanatory purposes as the invention extends beyond these limited embodiments.

Figure 1:
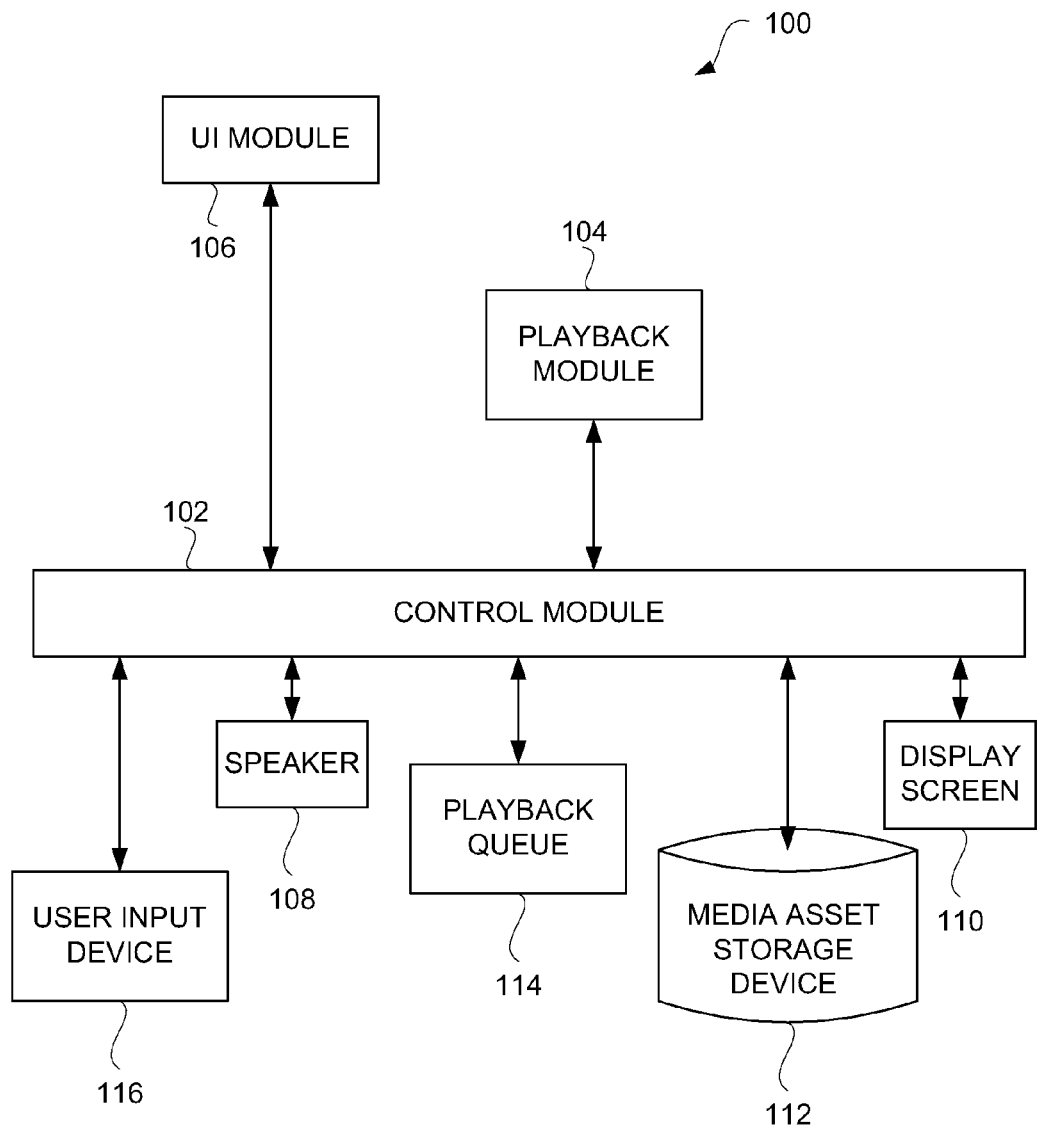
FIG. 1 is a block diagram of a client computing device according to one embodiment of the invention.

FIG. 1 is a block diagram of a client computing device 100 according to one embodiment of the invention. The client computing device 100 is configured to support storage and playback of digital media assets. A user of the client computing device 100 can also interact with the client computing device 100 to manage storage and playback of select digital media assets.

The client computing device 100 includes a processor 102 that controls management and playback of digital media assets by the client computing device 100. The processor 102 can interact with a playback module 104, a user interface (UI) module 106, a speaker 108, a display screen 110, a media asset storage device 112, a playback queue 114, and a user input device 116. The playback module 104 can operate to cause a digital media asset to be played back by the client computing device 100. The UI module 106 can operate to cause one or more graphical user interfaces to be presented on the display screen 110 by the client computing device 100. A user of the client computing device 100 can interact with the client computing device via the user input device 116 to provide input selections with respect to the graphical user interfaces. The speaker 108 can provide audio output (i.e., sound) in accordance with the digital media asset being played back. The media asset storage device 112 can store a plurality of digital media assets.

The graphical user interfaces presented on the display screen 110 and the user input device 116 enable the user of the client computing device 100 to browse or navigate the digital media assets and to select those one or more digital media assets to be played back by the processor 102 and managed by the playback module 104. If the user selects multiple ones of the digital media assets, then those digital media assets not immediately played can be maintained in the playback queue 114. As one digital media asset completes its playback, another digital media asset to be then played back can be obtained from the playback queue 110, unless such is empty.

The user input device 116 for the client computing device 100 can pertain to one or more input device. Examples of input devices include a touch surface, a pointing device (e.g., mouse), a microphone, a button, a rotary input device, etc. The nature of the user input being provided to the client computing device 100 via the user input device 116 can also vary. In one example, if a touch surface is used, the user input can be user touch gestures, either single-touch or multi-touch gestures. In another example, if a microphone is used, the user input can be voice inputs (e.g., voice commands).

Although the client computing device 100 can play back digital media assets and present audio and/or video output to users via the speaker 108 and/or the display screen 110, in one embodiment, the client computing device 100 can wirelessly transmit (e.g., stream) digital content for the digital media assets to another device that provides audio and/or video output. Here, for example, the another device having audio or video output capability can be used to present a digital media asset that has been designated at the client computing device for playback at the another device.

Also, if digital content for a digital media asset to be played is not available from the media asset storage device 112, in one embodiment, the digital content can be received from another device that wirelessly transmits (e.g., streams) the digital content to the client computing device 100. The digital content could be streams when needed or could be streamed in advance of playback and temporarily stored at the client computing device 100 for use during playback.

Figure 2:
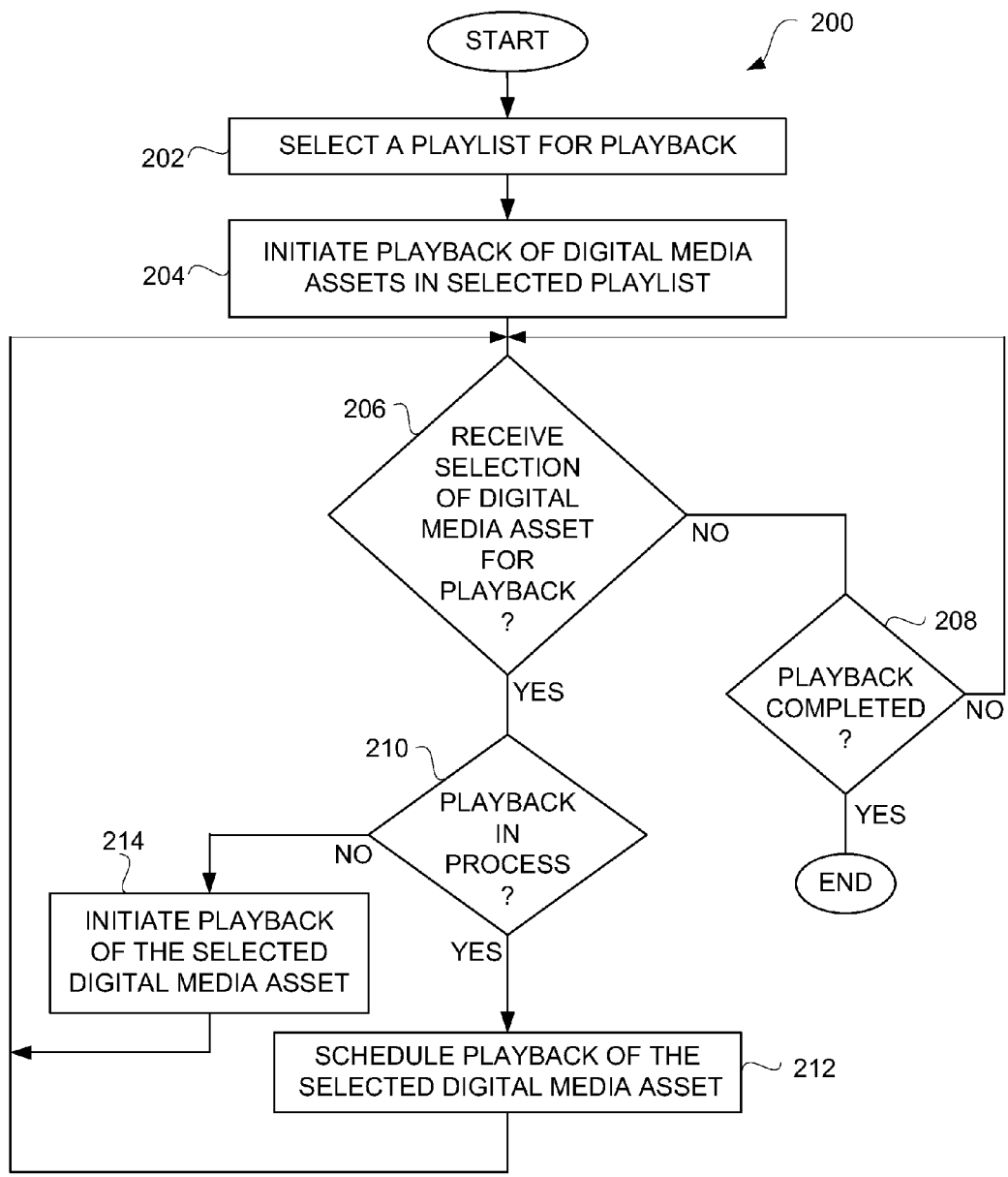
FIG. 2 is a flow diagram of a playback scheduling process according to one embodiment of the invention.

FIG. 2 is a flow diagram of a playback scheduling process 200 according to one embodiment of the invention. The playback scheduling process 200 can, for example, be performed by a client computing device, such as the client computing device 100 illustrated in FIG. 1.

The playback scheduling process 200 can select 202 a playlist for playback. Next, playback of one or more digital media assets in the selected playlist can be initiated 204. In the case in which the selected playlist includes more than one digital media asset, the digital media assets are playback sequentially. After playback is initiated 204, a decision 206 can determine whether selection of a digital media asset for playback has been received. Here, while the playback of the one or more of digital media assets in the selected playlist is ongoing, the client computing device can receive a selection of another digital media asset for playback.

When the decision 206 determines that a selection of another digital media asset for playback has not been received, a decision 208 can determine whether playback of the one and more digital media assets in the selected playlist has completed. When the decision 208 determines that playback has completed, then the playback scheduling process 200 can end. Alternatively, when the decision 208 determines that playback of the one or more digital media assets in the selected playlist has not been completed, the playback scheduling process 200 can return to repeat the decision 206.

On the other hand, when the decision 206 determines that a selection of another digital media asset for playback has been received, a decision 210 can determine whether playback is currently in process. In other words, when the client computing device is still playing back digital media assets, such as the one or more digital media assets in the selected playlist, the playback of the selected digital media asset can be scheduled 212. Here, as one example, the selected digital media asset can be scheduled 212 to begin its playback after the digital media asset currently being played completes. As another example, the selected digital media asset can be scheduled 212 to begin its playback after all the one or more digital media assets in the selected playlist have been played. Alternatively, when the decision 210 determines that playback is not currently in process, playback of the selected digital media asset can be initiated 214. Following the block 212 or the block 214, the playback scheduling process 200 can return to repeat the decision 206 and subsequent blocks.

Figure 3:
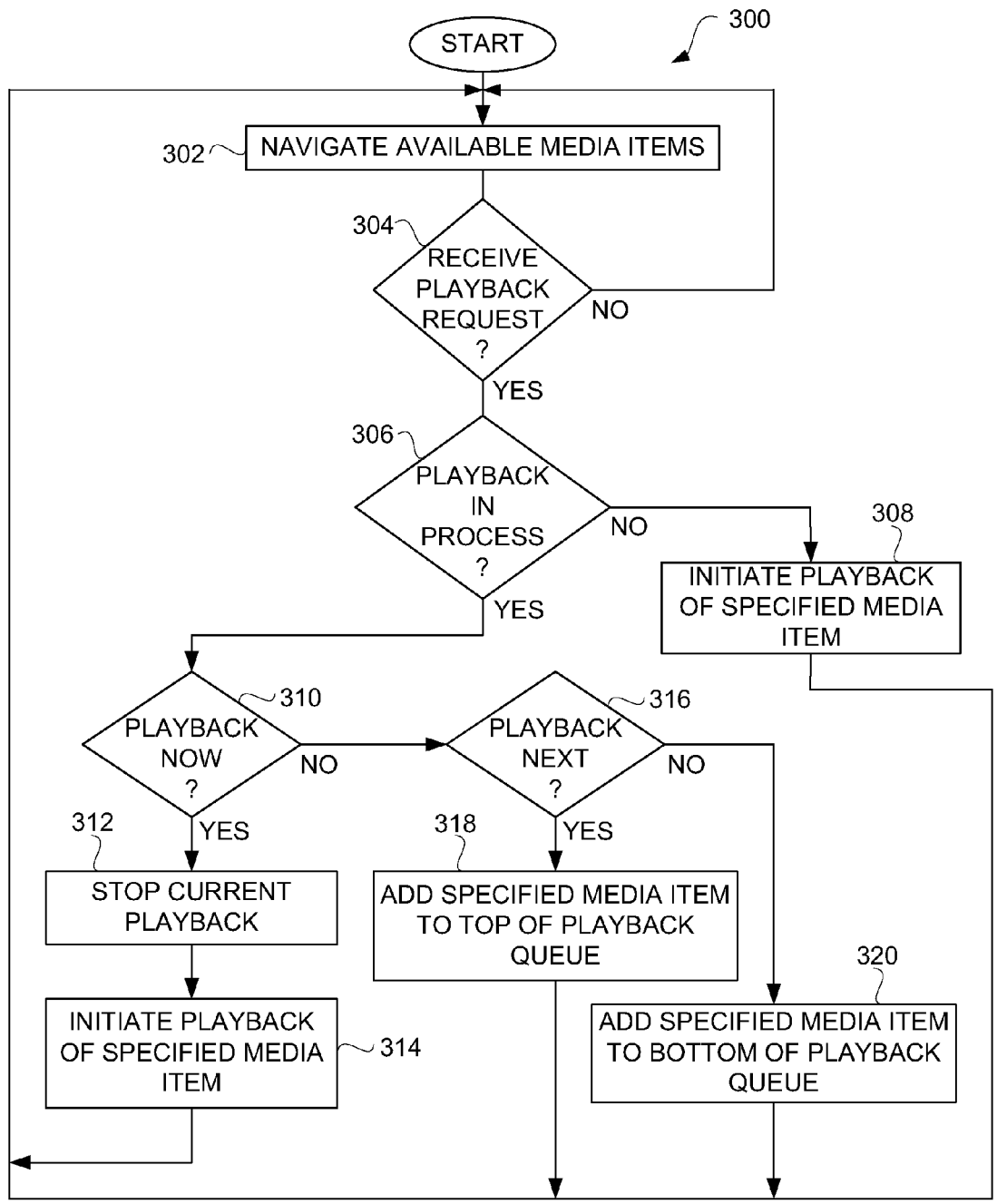
FIG. 3 is a flow diagram of a playback management process according to one embodiment of the invention.

FIG. 3 is a flow diagram of a playback management process 300 according to one embodiment of the invention. The playback management process 300 can, for example, be performed by a client computing device, such as the client computing device 100 illustrated in FIG. 1.

The playback management process 300 can navigate 302 through available media items. A decision 304 can then determine whether a playback request has been received. While navigating through the available media items, the user will at some point cause the client computing device to receive a playback request. Hence, when the decision 304 determines that a playback request has not yet been received, the playback management process 300 can return to repeat the block 302 so that navigation through the available media items can continue. Alternatively, when the decision 304 determines that a playback request has been received, a decision 306 can determine whether playback is in process. Here, the decision 306 determines whether the client computing device is currently playing back some other media item. When the decision 306 determines that playback is not in process, then playback of a specified media item can be initiated 308. The specified media item is specified by the playback request that has been received.

On the other hand, when the decision 306 determines that playback is currently in process, a decision 310 can determine whether the specified media item is to be immediately played (i.e., play back now). In one implementation, the user performing the navigation through the available media items can select the specified media item and can also provide an indication of whether the user desires the specified media item to be played back now or to have its playback scheduled. When the decision 310 determines that the specified media item is to be played back now, the playback currently in the process can be stopped 312, and playback of the specified media item can be initiated 314.

Alternatively, when the decision 310 determines that the specified media item is not to be immediately played, a decision 316 can determine whether the specified media item is to be played back next 316. Here, the decision 316 determines whether the specified media item is to be played back immediately following the playback of the currently played media item. When the decision 316 determines that the specified media item is to be played back next, the specified media item can be added 318 to a top of a playback queue. Alternatively, when the decision 316 determines that the specified media item is not to be played back next, the specified media item can be added 320 to a bottom of the playback queue.

Following the blocks 308, 314, 318 and 320, the playback management process 300 can return to repeat the block 302 so that additional media items, if desired, can be selected for playback. As noted above, the playback can be immediate, the playback can be as a next item, or the playback can be after playing one or more other previously scheduled media items.

FIGS. 4A-4F are representative screens that can be presented according to one embodiment. The representative screens can be associated with a hierarchical graphical user interface that can be provided on a display screen of a client computing device. The client computing device is, for example, a portable electronic device.

FIG. 4A illustrates a songs screen 400 that presents a plurality of songs available for selection. A highlight bar 402 can indicate that "Song d" has been highlighted. The highlighted song ("Song d") can then be selected by a user input action with respect to the client computing device. If the highlighted song is selected, a now playing screen 404 can be illustrated as shown in FIG. 4B. The now playing screen 404 can present a name and image pertaining to the highlighted song ("Song d").

While the highlighted song ("Song d") is playing, through user interaction with the client computing device, a playlist screen 406 can be illustrated as shown in FIG. 4C. The user can interact with the client computing device to highlight a song. A highlight bar 408 can indicate that the highlighted song ("Song 3") has been highlighted. If the highlighted song ("Song 3") is selected, an updated playlist screen 406' can be illustrated as shown in FIG. 4D. The updated playlist screen 406' is generally similar to the playlist screen 406 except that the updated playlist screen 406' includes a scheduling menu 410 as shown in FIG. 4D. The scheduling menu 410 can be displayed over a part of the list of songs within the playlist. The scheduling menu 410 can include a plurality of user-selectable options. The user-selectable options can be used to control how the playback of the selected song ("Song 3") is scheduled. A user can operate to select one of the user-selectable options. For example, the user-selectable options can, for example, include "Play Now", "Play Next" or "Add to Queue". The "Play Now" option requests that the selected song be played immediately (even if it requires that a currently playing song to be interrupted). The "Play Next" option requests that the selected song be played after a currently playing song completes its playback. The "Add to Queue" option requests that the selected song be placed in a playback queue (e.g., at end of playback queue).

FIG. 4E illustrates a queue screen 412 that presents a list of songs that are queued in a playback queue for playback. For example, if the selected song identified in FIG. 4D is to be added to the playback queue, the queue screen 412 includes the selected song (e.g., "Song 3"). After the currently playing song ("Song d") from the now playing screen 404 has completed its playback, a next song (e.g., "Song 3") for playback can be obtained from the playback queue. Once playback of the next song is initiated, a now playing screen 414 can be illustrated as shown in FIG. 4F. The now playing screen 414 can present a name and image pertaining to the next song ("Song 3").

In another embodiment, the scheduling menu 410 shown in FIG. 4D can include different or additional user-selectable options. The user-selectable options can be used to control how the playback of the selected song ("Song 3") is scheduled or played back. For example, the user-selectable options can, for example, include "Fade In Next", "Mix Into Next", "Play Next and Return", "Play Next and Others like it", or "Play Artist Next". The "Fade In Next" option can request that the selected song be played next with a fade in from the currently playing song which fades out. The "Mix Into Next" option can request that the selected song be played next with tempo being adjusted based on tempo of the currently playing song (possibly also with a fade in). The "Play Next and Return" option can request that the selected song be played next and then return to play whatever would have played had the selected song not been played. The "Play Next and Others like it" option can request that the selected song be played next and then play other songs that are deemed similar to the selected song. The Genius tool used in iTunes™ can, for example, be used to determine similar songs. The "Play Artist Next" option can request that the selected song be played next and then play other songs from the same artist.

In one embodiment, if the screens shown in FIGS. 4A-4F are provided on a touch sensitive screen, then user selections can be made with user selections. In some cases, the user selection can pertains to gestures. The gestures can be single-touch or multi-touch gestures. For example, the user selectable options associated with the scheduling menu 410 could be supported by user touch inputs, with or without displaying the scheduling menu.

It should be noted that in one embodiment, a user can interact with the client computing device to alter the playback queue. As discussed above, a user can add media items to the playback queue. As another example, a user could reorder any of the media items within the playback queue. As another example, a user can delete one or media items from the playback queue. Still further, based on events or circumstances, the client computing device can itself operate (i.e., without user request) to add media items, delete media items or reorder media items with respect to the playback queue.

Figure 5A:
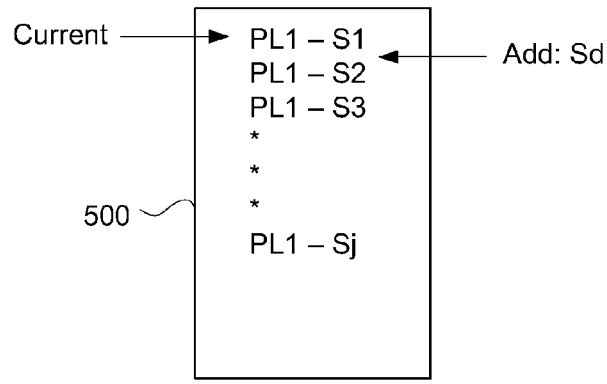
FIGS. 5A-5C are diagrams illustrating management of a playback queue according to one embodiment.
Figure 5B:
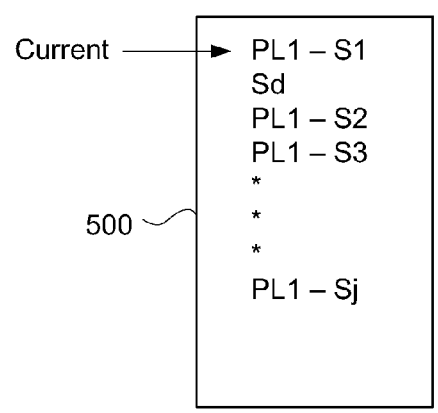
Figure 5C:
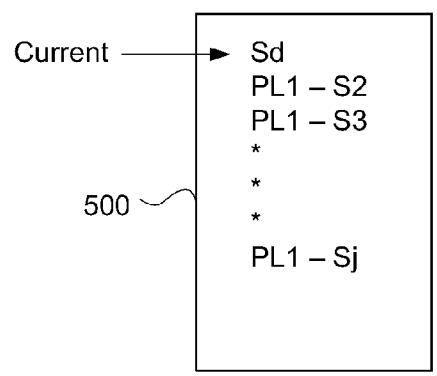

FIGS. 5A-5C are diagrams illustrating management of a playback queue according to one embodiment. FIG. 5A is a representation of a playback queue 500 in which media items of a first playlist (PL1) have previously been queued for playback. The media items of the first playlist (PL1) in the playback queue 500 include a sequence of songs, namely, PL1-S1, PL1-S2, PL1-S3, . . . , PL1-Sj. Hence, the playback queue 500 shown in FIG. 5A has songs from the first playlist (PL1) queued in a particular order. Assume that the song PL1-S1 is currently being played and that during such playback another song Sd is selected for playback. Also assume that the selected song Sd is to be inserted into the playback queue such that it is played next (i.e., played after the currently playing song completes). FIG. 5B illustrates the playback queue 500 after the selected song Sd has been inserted. Note that although the song PL1-S1 is still currently being played, the song Sd has been queued for playback next. The song Sd can thus be considered at the top of the playback queue 500. Following the song Sd in the playback queue 500, the remaining previously queued songs from the first playlist PL1 remain. FIG. 5C illustrates the playback queue 500 after the song PL1-S1 has completed its playback and playback of the song Sd has begun. Note that in FIG. 5C, the song PL1-S1 has been removed from the playback queue 500 since it has already been played back.

In the playback queue 500 shown in FIGS. 5A-5C, the currently playing song can remain in the playback queue 500 until it has been completely played. However, in another embodiment, the currently playing song can be removed from the playback queue 500 once its playback is initiated.

Figure 6A:
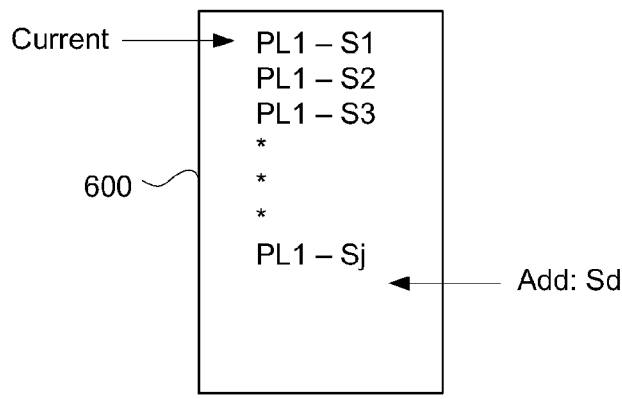
FIGS. 6A-6C are diagrams illustrating management of a playback queue according to another embodiment.
Figure 6B:
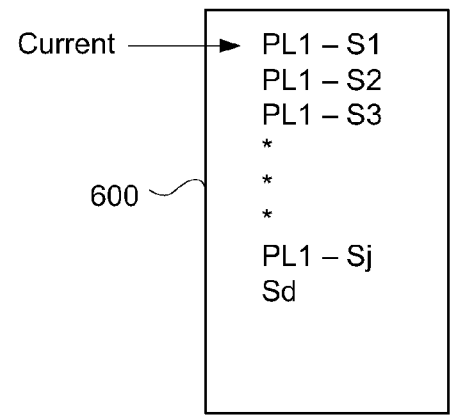
Figure 6C:
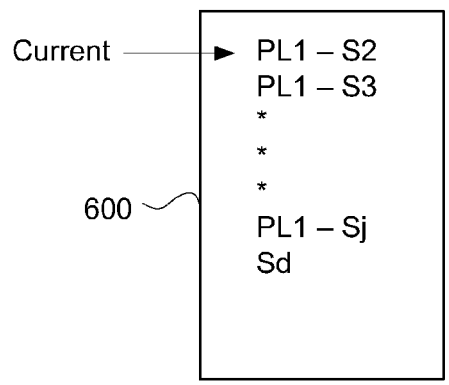

FIGS. 6A-6C are diagrams illustrating management of a playback queue according to another embodiment. FIG. 6A is a representation of a playback queue 600 in which media items of a first playlist (PL1) have previously been queued for playback. The media items of the first playlist (PL1) in the playback queue 600 include a sequence of songs, namely, PL1-S1, PL1-S2, PL1-S3, ..., PL1-Sj. Hence, the playback queue 600 shown in FIG. 6A has songs from the first playlist (PL1) queued in a particular order. Assume that the song PL1-S1 is currently being played and that during such playback another song Sd is selected for playback. Also assume that the selected song Sd is to be inserted into the playback queue such that it is played after one or more previously queued songs already in the playback queue 600. FIG. 6B illustrates the playback queue 600 after the selected song Sd has been inserted. Note that although the song PL1-S1 is still currently being played, the song Sd has been queued for playback after all of the songs of the first playlist (PL1). The song Sd can thus be considered at the bottom of the playback queue 600. FIG. 6C illustrates the playback queue 600 after the song PL1-S1 has completed its playback and playback of the song PL1-S2 has begun. Note that in FIG. 6C, the song PL1-S1 has been removed from the playback queue 600 since it has already been played back.

In the playback queue 600 shown in FIGS. 6A-6C, the currently playing song can remain in the playback queue 600 until it has been completely played. However, in another embodiment, the currently playing song can be removed from the playback queue 600 once its playback is initiated.

Figure 7:
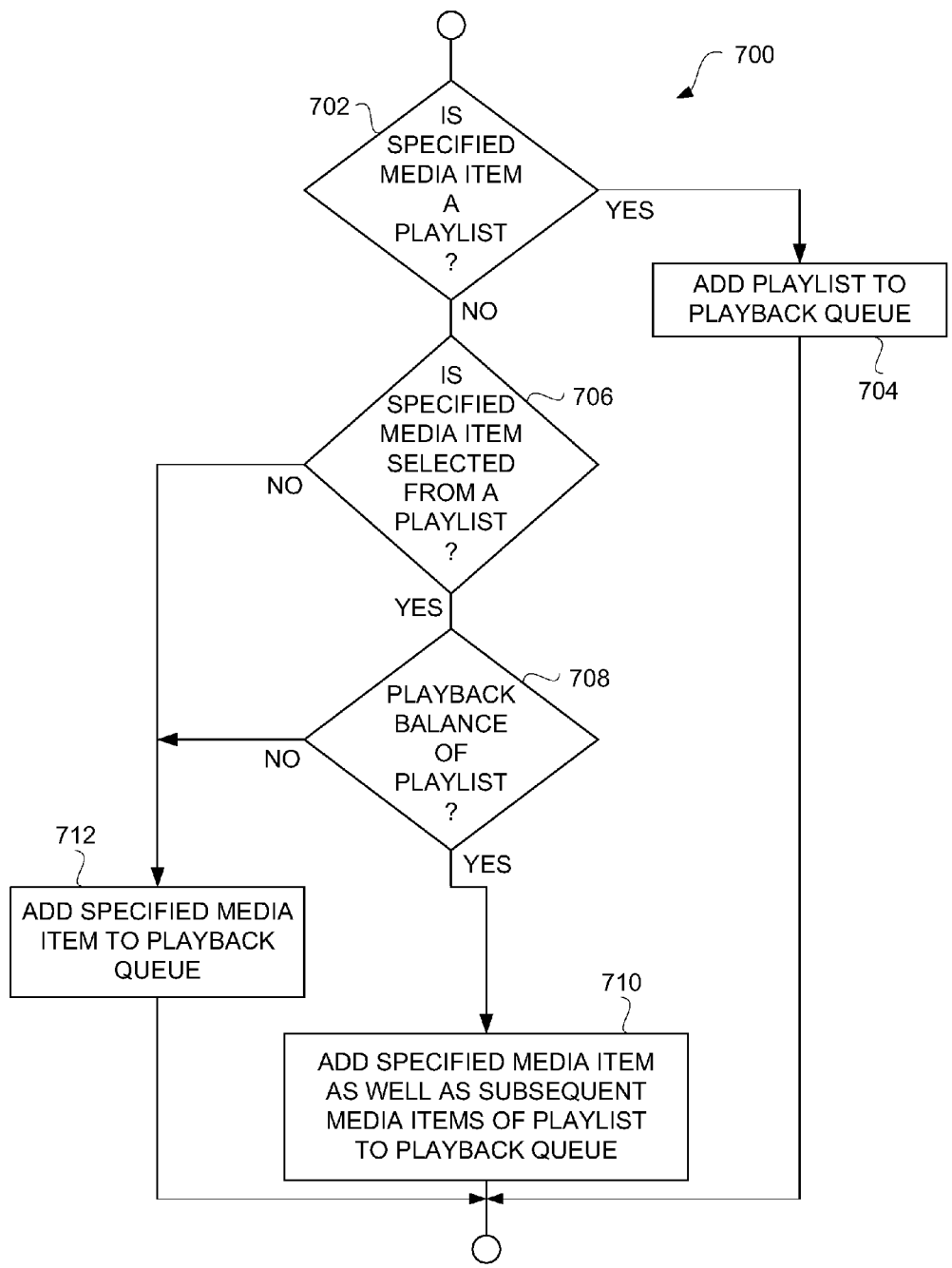
FIG. 7 illustrates a flow diagram of a playlist queuing process according to one embodiment of the invention.

FIG. 7 illustrates a flow diagram of a playlist queuing process 700 according to one embodiment of the invention. The playlist queuing process 700 concerns processing associated with placing a selected media item within a playback queue.

The playlist queuing process 700 can begin with a decision 702 that determines whether the specified media item is a playlist. When the decision 702 determines that the specified media item is a playlist, the playlist can be added 704 to the playback queue. Here, the entire playlist can be added 704 to the playback queue.

Alternatively, when the decision 702 determines that the specified media item is not a playlist, a decision 706 can determine whether the specified media item is selected from a playlist. When the decision 706 determines that the specified media item is selected from a playlist, a decision 708 can determine whether a balance of the playlist is to be added to the playback queue. When the decision 708 determines that the balance of the playlist is to be played back, the specified media item as well as subsequent media items of the playlist can be added 710 to the playback queue.

On the other hand, when the decision 706 determines that the specified media item is not selected from a playlist, or when the decision 708 determines that the balance of the playlist is not to be played back, the specified media item can be added 712 to the playback queue. Following the blocks 704, 710 and 712, the playlist queuing process 700 can conclude.

Figure 8A:
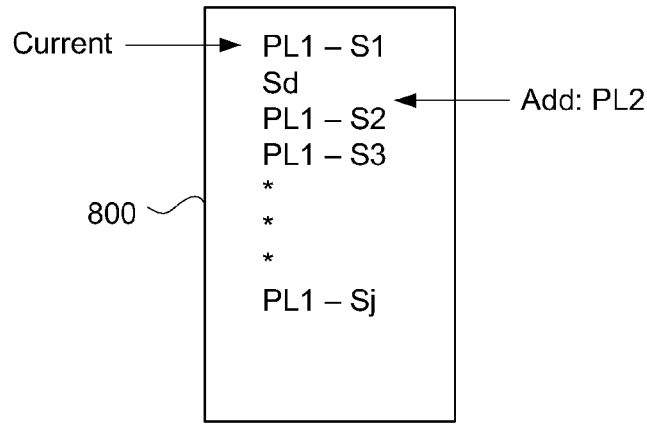
FIGS. 8A-8C are diagrams illustrating management of a playback queue according to one embodiment.
Figure 8B:
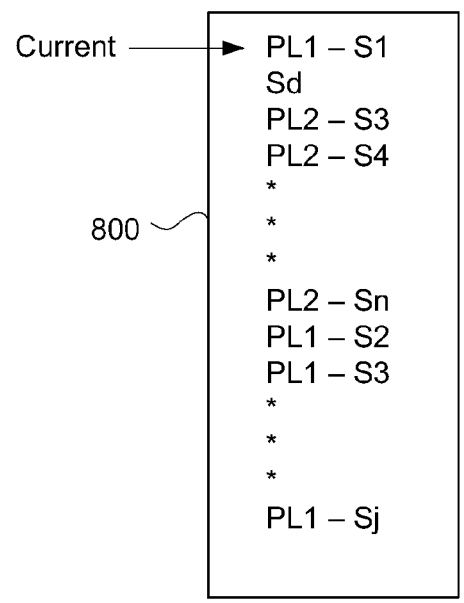
Figure 8C:
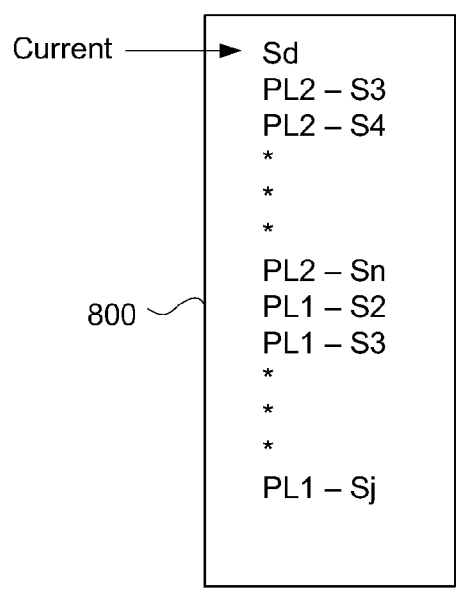

FIGS. 8A-8C are diagrams illustrating management of a playback queue according to one embodiment. FIG. 8A is a representation of a playback queue 800 in which media items of a first playlist (PL1) have previously been queued for playback. The media items of the first playlist (PL1) in the playback queue 800 include a sequence of songs, namely, PL1-S1, PL1-S2, PL1-S3, ..., PL1-Sj. In addition, a selected song Sd has been inserted into the playback queue 800 such that it is played next (i.e., played after the currently playing song completes). Further, assume that while the song PL1-S1 is currently being played, a second playlist (PL2) is selected for playback. Also assume that the second playlist (PL2) is to be inserted into the playback queue 800 such that it is played next. FIG. 8B illustrates the playback queue 800 after the second playlist (PL2) has been inserted. Note that although the song PL1-S1 is still currently being played, the songs of the second playlist (PL2) are inserted into the playback queue 800 after the song Sd (and before the remaining songs of the first playlist (PL1)). The song Sd can this be considered at the top of the playback queue 800. Following the song Sd in the playback queue 800, the remaining previously queued songs from the first playlist PL1 remain. FIG. 8C illustrates the playback queue 800 after the song PL1-S1 has completed its playback and playback of the song Sd has begun. Note that in FIG. 8C, the song PL1-S1 has been removed from the playback queue 800 since it has already been played back. In the playback queue 800 shown in FIGS. 8A-8C, the currently playing song can remain in the playback queue 800 until it has been completely played. However, in another embodiment, the currently playing song can be removed from the playback queue 800 once its playback is initiated.

Figure 9:
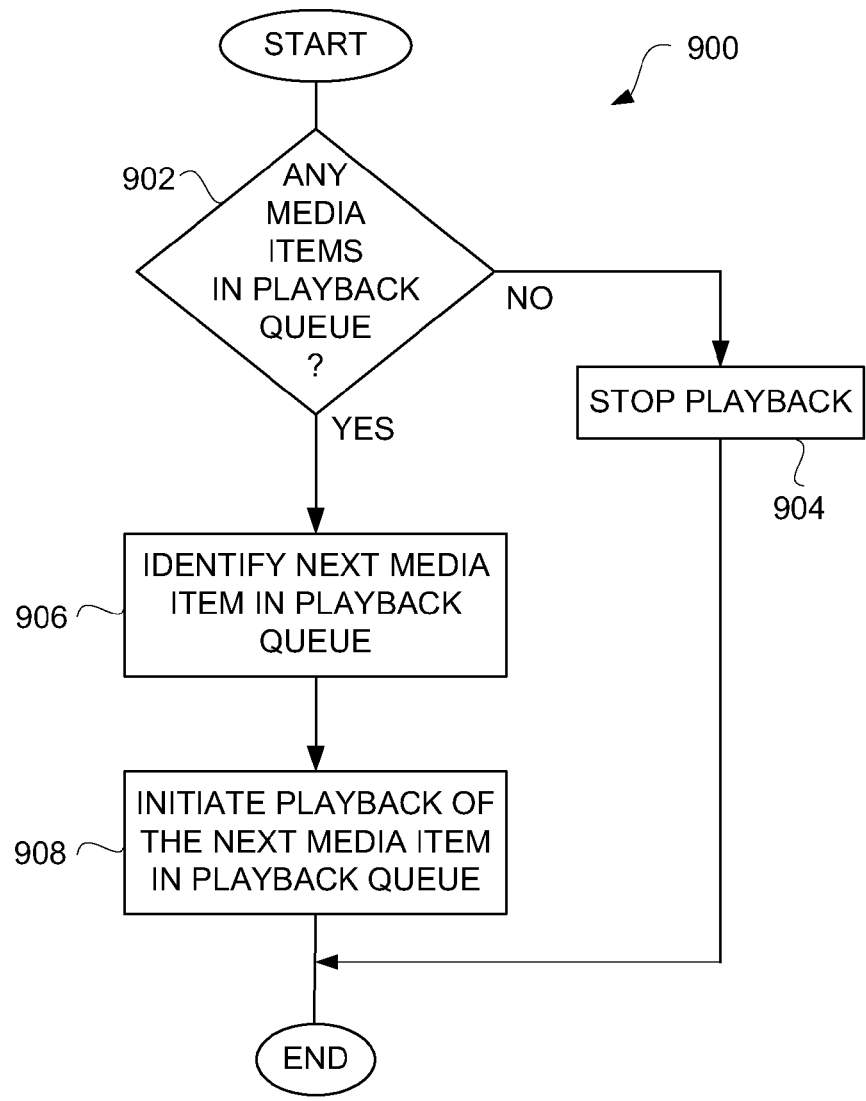
FIG. 9 is a flow diagram of a playback continue process according to one embodiment of the invention.

FIG. 9 is a flow diagram of a playback continue process 900 according to one embodiment of the invention. The playback continue process 900 can be performed when the client computing device completes the playback of a currently playing media item. According to the playback continue process 900, a decision 902 can determine whether there are any media items in a playback queue. When the decision 902 determines that there are no media items in the playback queue, then playback of media items by the client computing device can be stopped 904. Alternatively, when the decision 902 determines that there are one or more media items in the playback queue, a next media item in the playback queue can be identified 906. Then, the playback of the next media item in the playback queue can be initiated 908. In one embodiment, one or more transition effect can be provided to improve the transition between ending of playback of the currently playing media items and starting of playback of the next media item. The transition can be audio, such as fading and/or mixing, or can be visual, such as animations. Following the block 904 or the block 908, the playback continue process 900 can end. However, it should be noted that the playback continue process 900 can be activated each time the client computing device completes (or is about to complete) the playback of a currently played media item.

It should be noted that the playback queue can but need not contain digital content for any of the media items in the playback queue. Instead, the playback queue need only include a reference or pointer to the digital content for the particular media item.

In another embodiment, multiple users can schedule playback of digital media assets. For example, multiple users can contribute digital media assets for playback to a media playback queue being utilized by a master playback device. The master playback device can be associated with another user or an establishment. Users, such as visitors or friends, can thus contribute digital media assets to a media playback queue. The master playback device can managed the media playback queue and thus select subsequent digital media assets to be played back. Different rules or policies can govern placement of contributed digital media assets to the media playback queue. Typically, users with compatible electronic devices can contribute selections of digital media assets wirelessly and/or via a wired network. If desired, a password can be used to control those others that are allowed to contribute digital media assets. Contributing users can also be allowed to rate or vote on digital media assets to be played, or on audio characteristics, such as volume of playback. Contributing users can also be allowed to rate or vote on request adding, removing or positioning digital media assets within the media playback queue.

The digital media assets (i.e., media items) can pertain to video items (e.g., videos, movies or television shows), audio items (e.g., audio files or audio tracks, such as for songs (music) or audiobooks or podcasts or electronic books or voice recordings), image items (e.g., photos), or multimedia presentations. The digital media assets being scheduled for playback on a particular device can by of the same type or different types. In one example, the scheduled digital media assets can be all audio items. In another example, the scheduled digital media assets can be a mixture of audio items and a mixture of video items.

In one embodiment, digital media assets being scheduled as discussed above can be generated as needed. For example, a user of a computing device could record a new digital media asset and then schedule its playback. In one example, a video segment could be recorded by a computing device and then placed in a media playback queue for playback. In another example, a voice recording could be recorded by a computing device and then placed in a media playback queue for playback. For example, the voice recording could be used as an introduction, a message, a promotion, or an announcement. As a particular example, the voice recording could serve to announce a next or subsequent digital media asset to be played.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of certain embodiments is that digital media assets can be scheduled to play next even while another digital media asset is being concurrently played. Another advantage of certain embodiments is that a playback queue can be provided and maintained to enable a user to queue multiple digital media assets. Still another advantage of certain embodiments is that multiple users can contribute to a playback queue at a location (e.g., venue) that is playing media for patrons.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for controlling playback of digital media assets on a client computing device, the method comprising:
   providing a queue for identifying one or more digital media assets that are to be played back at the client computing device;
   selecting a current digital media asset from the queue for playback;
   initiating playback of the current digital media asset by the client computing device;
   receiving, during playback of the current digital media asset, a selection of a particular digital media asset to be played back;
   placing, during playback of the current digital media asset, the particular digital media asset that has been selected in the queue without interrupting the playback of the current digital media asset; and
   receiving a user indication of where the particular digital media asset should be placed in the queue.

2. A method as recited in claim 1, wherein the particular digital media asset is placed in the queue based on the user indication.

3. A method as recited in claim 1, wherein the user indication is a first user indication or a second user indication, and
   wherein the particular digital media asset is placed at the top of the queue based on the first user indication, and placed at the bottom of the queue based on the second user indication.

4. A method as recited in claim 1, wherein the particular digital media asset is placed within the queue such that it is selected to next be played after the current digital media asset completes its playback.

5. A method for controlling playback of digital media assets on a client computing device, the method comprising:
   providing a queue for identifying one or more digital media assets that are to be played back at the client computing device;
   selecting a current digital media asset from the queue for playback;
   initiating playback of the current digital media asset by the client computing device;
   receiving, during playback of the current digital media asset, a selection of a particular digital media asset to be played back; and
   placing, during playback of the current digital media asset, the particular digital media asset that has been selected in the queue without interrupting the playback of the current digital media asset,
   wherein the particular digital media asset is placed within the queue such that it is selected to be played after all of the other digital media assets remaining in the queue have been played back.

6. A method for controlling playback of digital media assets on a client computing device, the method comprising:
   providing a queue for identifying one or more digital media assets that are to be played back at the client computing device;
   selecting a current digital media asset from the queue for playback;
   initiating playback of the current digital media asset by the client computing device;
   receiving, during playback of the current digital media asset, a selection of a particular digital media asset to be played back;
   placing, during playback of the current digital media asset, the particular digital media asset that has been selected in the queue without interrupting the playback of the current digital media asset; and
   playing, following playback of the current digital media asset, the particular digital media asset that has been placed in the queue after the playback of the current digital media asset ends.

7. A method as recited in claim 1, wherein the placing comprises interposing playback of the particular digital media asset as the next particular digital media asset to be played once the playback of the current digital media asset has completed.

8. A method as recited in claim 1, wherein the client computing device is a hand-held computing device that includes a storage device for storing the current digital media asset as well as the particular digital media asset.

9. A method as recited in claim 1, wherein the client computing device is a hand-held computing device that streams the current digital media asset to another device having audio or video output capability to present the current digital media asset via the another device.

10. A method for controlling playback of digital media assets on a client computing device, the method comprising:
operating a digital media playback device in a first playback mode or a second playback mode;
providing a playback queue configured to contain digital media assets to be played back;
playing back at least one of the digital media assets in the playback queue;
receiving at least one first user selection of a particular digital media asset or a particular digital media asset group;
if in the first mode,
interrupting the digital media asset currently being played in response to the at least one first user selection, and
playing the particular digital media asset or the particular digital media asset group instead of the digital media asset currently being played; and
if in the second mode,
placing the particular digital media asset or the particular digital media asset group into the playback queue such it is played after the digital media asset currently being played has completed.

11. A method as recited in claim 10, wherein, if in the second mode, the placing the particular digital media asset or the particular digital media asset group into the playback queue is such it is played promptly after the digital media asset currently being played has completed.

12. A method as recited in claim 10, wherein if in the second mode, the method further comprises:
playing the particular digital media asset or the particular digital media asset group after completing playback of the digital media asset currently being played; and
returning, following the playback of the particular digital media asset or the particular digital media asset group in the playback queue, to playback other of the digital media assets provided in the playback queue.

13. A non-transitory computer readable medium including at least computer program code tangibly stored thereon for controlling playback of digital media assets on a client computing device, the method comprising:
computer program code for providing a queue for identifying one or more digital media assets that are to be played back at the client computing device;
computer program code for selecting a current digital media asset from the queue for playback;
computer program code for initiating playback of the current digital media asset by the client computing device;
computer program code for receiving, during playback of the current digital media asset, a selection of a particular digital media asset to be played back;
computer program code for placing, during playback of the current digital media asset, the particular digital media asset that has been selected in the queue without interrupting the playback of the current digital media asset; and
computer program code for placing, during playback of the current digital media asset, the particular digital media asset that has been selected in the queue without interrupting the playback of the current digital media asset
computer program code for playing, following playback of the current digital media asset, the particular digital media asset that has been placed in the queue after the playback of the current digital media asset ends.

14. An electronic device, comprising:
a media asset storage device configured to store a plurality of digital media assets;
a user input device configured to receive one or more user inputs to specify user selection of one or more of the digital media assets;
a display screen for presenting at least one graphical user interface that facilitates the user selection of one or more of the digital media assets;
a playback queue configured to store an indication of any of the one or more of the digital media assets selected by the user selection that are to be subsequently played;
a playback module configured to manage playback of the one or more of the digital media assets selected by the user selection using the user input device; and
a processor for performing playback of the one or more of the digital media assets as managed by the playback module,
wherein the playback module is configured to (i) initiate playback of a current digital media asset by the processor; and (ii) place, during playback of the current digital media asset, a particular digital media asset that has been selected using the user input device into the playback queue without interrupting the playback of the current digital media asset.

15. An electronic device as recited in claim 14, wherein the playback module is further configured to subsequently play the particular digital media assets that have been placed in the playback queue after the playback of the current digital media asset.

16. An electronic device as recited in claim 14, wherein the electronic device is a hand-held electronic device.

17. A method as recited in claim 1, wherein the placing comprises interposing playback of the particular digital media asset as the next particular digital media asset to be played once the playback of the current digital media asset has completed.

18. A method as recited in claim 1, wherein the client computing device is a hand-held computing device that includes a storage device for storing the current digital media asset as well as the particular digital media asset.

19. A method as recited in claim 1, wherein the client computing device is a hand-held computing device that streams the current digital media asset to another device having audio or video output capability to present the current digital media asset via the another device.

* * * * *